US008819202B1

(12) United States Patent
Carolan et al.

(10) Patent No.: US 8,819,202 B1
(45) Date of Patent: Aug. 26, 2014

(54) SERVICE CONFIGURATION AND DEPLOYMENT ENGINE FOR PROVISIONING AUTOMATION

(75) Inventors: Jason T. Carolan, Superior, CO (US); John G. Holland, Santa Fe, NM (US); Scott A. Radeztsky, Aurora, IL (US)

(73) Assignee: Oracle America, Inc., Redwood City, CA (US)

( * ) Notice: Subject to any disclaimer, the term of this patent is extended or adjusted under 35 U.S.C. 154(b) by 3073 days.

(21) Appl. No.: 11/194,220

(22) Filed: Aug. 1, 2005

(51) Int. Cl.
*G06F 15/16* (2006.01)

(52) U.S. Cl.
USPC .......................................... 709/223

(58) Field of Classification Search
USPC ............................................ 709/223
See application file for complete search history.

(56) References Cited

U.S. PATENT DOCUMENTS

| 6,801,992 | B2 | 10/2004 | Gajjar et al. | |
|---|---|---|---|---|
| 6,895,367 | B1 * | 5/2005 | Lee ................ | 702/186 |
| 2001/0047385 | A1 * | 11/2001 | Tuatini .......... | 709/203 |
| 2002/0158898 | A1 | 10/2002 | Hsieh et al. | |
| 2003/0195757 | A1 | 10/2003 | Greenstein | |
| 2004/0039815 | A1 | 2/2004 | Evans et al. | |
| 2004/0128651 | A1 | 7/2004 | Lau | |
| 2004/0230681 | A1 | 11/2004 | Strassner et al. | |
| 2005/0071623 | A1 | 3/2005 | Goud et al. | |
| 2005/0149924 | A1 | 7/2005 | Komarla et al. | |
| 2005/0172281 | A1 * | 8/2005 | Goring et al. ................. | 717/174 |
| 2005/0177600 | A1 * | 8/2005 | Eilam et al. ................ | 707/104.1 |
| 2005/0177829 | A1 | 8/2005 | Vishwanath | |
| 2006/0059107 | A1 * | 3/2006 | Elmore et al. ................. | 705/64 |
| 2006/0265583 | A1 * | 11/2006 | Eilam et al. ................... | 713/100 |
| 2008/0034219 | A1 * | 2/2008 | Ting ............................. | 713/186 |

\* cited by examiner

*Primary Examiner* — Sulaiman Nooristany
(74) *Attorney, Agent, or Firm* — Marsh Fischmann & Breyfogle LLP; Kent A. Lembke

(57) ABSTRACT

A method for automating provisioning of services in a target computer system. The method includes providing a set of provisioning adaptors each defining an interface to a provisioning application and receiving a provisioning request from a user interface. The method further includes identifying one of the provisioning applications for completing a provisioning operation based on the received provisioning request, and then, invoking the identified one of the provisioning applications using one of the interfaces defined by one of the provisioning adaptors associated with the provisioning tool or application. The method includes providing agents on the components of the target computer system collecting configuration regarding the components from the provisioning agents, and using the collected data during identifying provisioning applications and invoking the identified applications. Dependencies are determined during the method that need to be complied with during provisioning, and the method includes ensuring compliance with these dependencies.

9 Claims, 7 Drawing Sheets

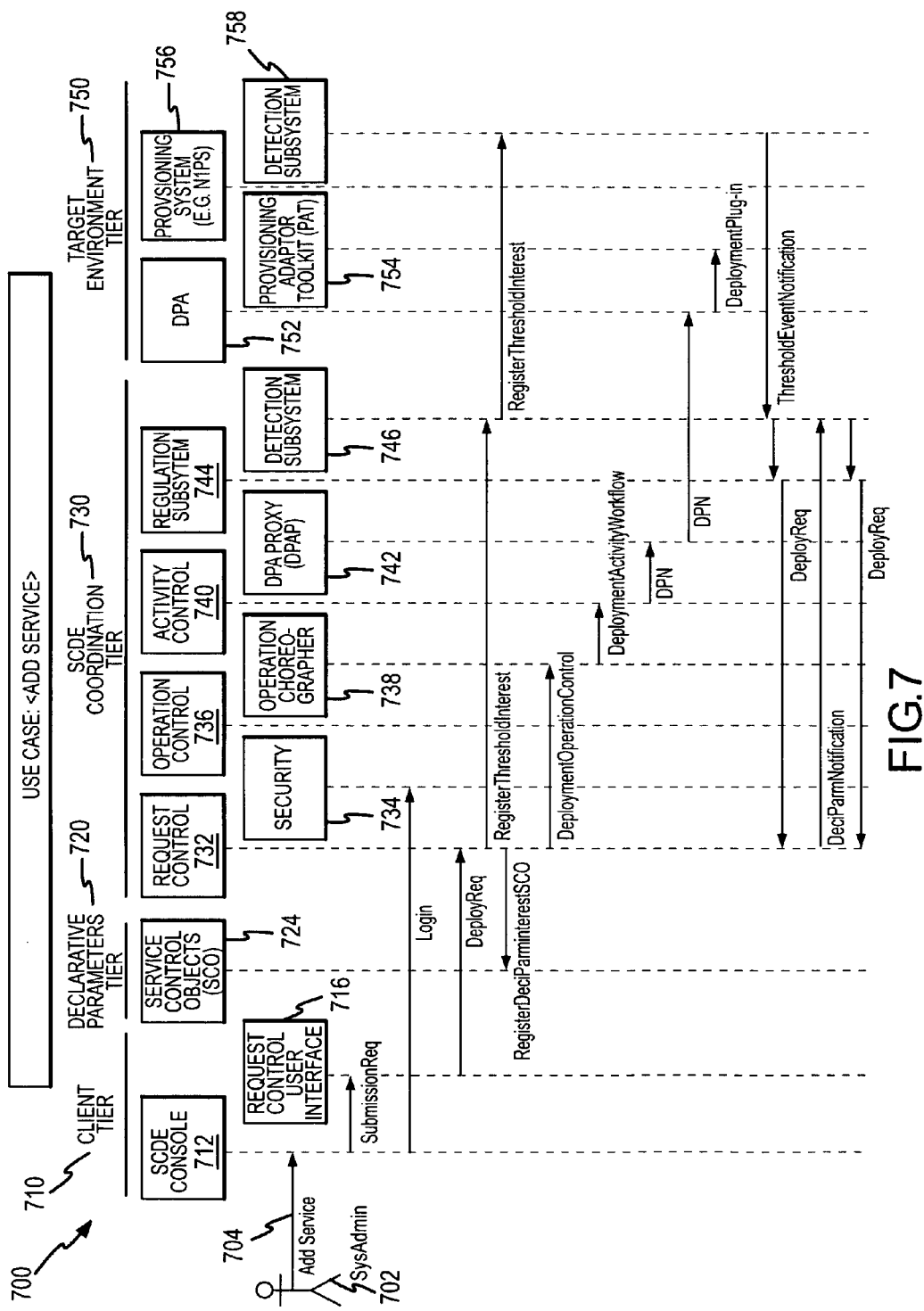

SERVICE CONFIGURATION AND DEPLOYMENT ENGINE FOR PROVISIONING AUTOMATION

BACKGROUND OF THE INVENTION

1. Field of the Invention

The present invention relates, in general, to methods and techniques of setting up and configuring the services that run on single or multiple computer systems, network systems, or storage systems, including those within or between data centers, which may include provisioning of services and software applications within or between such single or multiple computer systems, network systems, or storage systems, and, more particularly, to a method, and systems configured to support using such a method, for automating the provisioning of single or multiple computer systems, network systems, or storage systems, such as a data center or the like, including providing a virtualization layer between a user interface or input mechanism and one or more provisioning, monitoring, or network-based policy products or applications, and communicating with agents hosted in single or multiple computer systems, network systems, or storage systems to collect real time configuration and other data useful for determining provisioning processes and managing dependencies during provisioning.

2. Relevant Background

The complexity of building and managing computing environments, such as data centers, has increased significantly in recent years. System administrators are often responsible for managing numerous hardware components including hundreds or even thousands of servers, switches, applications, and data storage devices. As companies add new servers or otherwise change the configuration of the computing environment such as by re-provisioning existing servers, switches and storage systems, the company is faced with large costs associated with administrator time, e.g., hours or days depending on the system, as many provisioning and configuration tasks are performed manually. As the number, complexity, and dynamic nature of systems grows, even routine administrative tasks can become complicated and time consuming. Additionally, the amount of human operator involvement in the provisioning tasks can result in error and operating problems or inefficiencies. Finally, humans may not always make the optimization decisions, but instead, control devices and policy based network management systems are frequently asked to optimize multiple decisions. System administrators continue to look for tools to simplify and automate the provisioning process.

For example, provisioning in a data center may involve an administrator bringing in new server or other hardware devices. The administrator manually provides communication cabling and power to the server, and then, loads an operating system including deciding which version, what agents to provide, and assigning an IP or network address. The provisioning of the new server may further include configuring data storage and network components, e.g., a switch or the like, to support the new server. Applications have to be loaded and any additional support code provided in the server. Finally, the server, application, network and storage systems are typically hooked into an enterprise-wide observability system, and often work in concert with other local or distributed services (e.g., directory/identity, caches, backup, and security). Dependencies can become problematic during the provisioning process as certain tasks have to be performed in specific orders and may affect later tasks. Specifically, the loading and configuring of the applications may affect the network components, which may have to be reconfigured. Network changes may change storage requirements, but most likely server changes will require network or storage configuration changes. The system administrator not only must be aware of the dependencies arising during the manual provisioning but must understand the order in which provisioning should be completed. Provisioning is a time consuming process that typically has to be done sequentially by the administrator. Due to the amount of administrator involvement, the number and types of human or operator error that may occur is quite large and is difficult to avoid. Additional complexity is added when multiple systems must act in concert to provide a service: a traditional three-tiered service (web servers, application servers, database servers) is a simple example of a service that may span multiple datacenters, heterogeneous systems, or owners. Finally, there is typically a reason that computer systems, network systems and storage systems are being provisioned such as in response to new business opportunities, the need for a larger set of functionality, or an increase in the number of end users.

Hence, there remains a need for a method and system for automating at least portions of the provisioning of a computing environment such as a data center. Preferably, such a method and system would provide a way of orchestrating the entry of management and control information by an administrator with the automated control and interfacing with provisioning tools to reduce the amount of time required for provisioning and the number of errors. Such a system preferably would also provide a "pluggable" set of interfaces to allow connection to a variety of provisioning systems.

SUMMARY OF THE INVENTION

The present invention addresses the above and other problems by providing a method and corresponding systems for automating service configuration and deployment of services in a target or host single or multiple computer systems, network systems, or storage systems, such as a data center or the like. The method provides a mechanism for virtualizing and communicating with a number of provisioning tools or applications that may be called or used to carry out a provisioning or deployment request from a user (e.g., a system administrator). The virtualization mechanism functions to provide a provisioning adaptor for each provisioning tool or application that defines a common interface to that tool or application. The method also includes providing mechanisms for determining dependencies that may have to be followed during operation of the provisioning applications to effectively provision the target single or multiple computer systems, network systems, or storage systems. Further, current or up-to-date confirmation and/or operation data is collected from the target system via provisioning agents installed on each component or box in the target system, and this allows the dependencies to be defined correctly and provisioning to be carried out with accurate configuration data. The method and system of the invention is configured (e.g., a service configuration and deployment engine (SCDE) according to the invention is configured) to plug into and use information from observability, control, and policy based network management systems to enable the optimization of provisioning decisions.

More particularly, a method is provided for automating provisioning of services in a target single or multiple computer systems, network systems, or storage systems. The method includes providing a set of provisioning adaptors each defining an interface to a provisioning application and receiving a provisioning request from a user interface. The method further includes identifying one of the provisioning applications for completing a provisioning operation based on the received provisioning request, and then, invoking the identified one of the provisioning applications using one of the interfaces defined by one of the provisioning adaptors associated with the provisioning tool or application. The method may include providing provisioning agents on one or more of the components or "boxes" of the target single or multiple computer systems, network systems, or storage systems, collecting configuration or other data regarding the components from the provisioning agents, and using the collected data as part of the steps of identifying the correct provisioning applications and invoking the identified applications. A set of dependencies is determined during the method that need to be complied with during provisioning operations and the method may include ensuring compliance with this set of dependencies (such as an order for completing provisioning, observability, control, or policy based network management operations or activities within an operation or the like).

BRIEF DESCRIPTION OF THE DRAWINGS

FIG. 7 illustrates a use case for adding a service with a provisioning system employing embodiments of the SCDE of the present invention.

DETAILED DESCRIPTION OF THE PREFERRED EMBODIMENTS

In brief, the present invention is directed to a method and system for effectively automating provisioning in single or multiple computer systems, network systems, or storage systems, such as data centers or the like. The method includes providing a service configuration and deployment engine (SCDE) system between an input console or user interface and a provisioning platform of provisioning tools and/or applications. The SCDE can be thought of as providing a software or virtualization layer around the provisioning platform to take provisioning requests and requirements from the input or control console and to output various resource requirements and descriptions, which may involve converting a provisioning request to a deployment language. The SCDE takes this payload and performs various dependency checks and management based on configuration and other data collected by provisioning agents provided throughout the target system or environment (e.g., typically, a provisioning agent is provided in each box or at each device to collect up-to-date system data). A provisioning adaptor toolkit or virtualization component is included to provide provisioning adaptors that facilitate communications with or plugging in to one or more provisioning tools, e.g., a third party provisioning application, which acts to complete provisioning based on the agent-collected data and identified dependencies among the provisioning tasks. The SCDE interfaces enable provisioning requests from an end user or other control or network based policy management systems.

Figure 1:
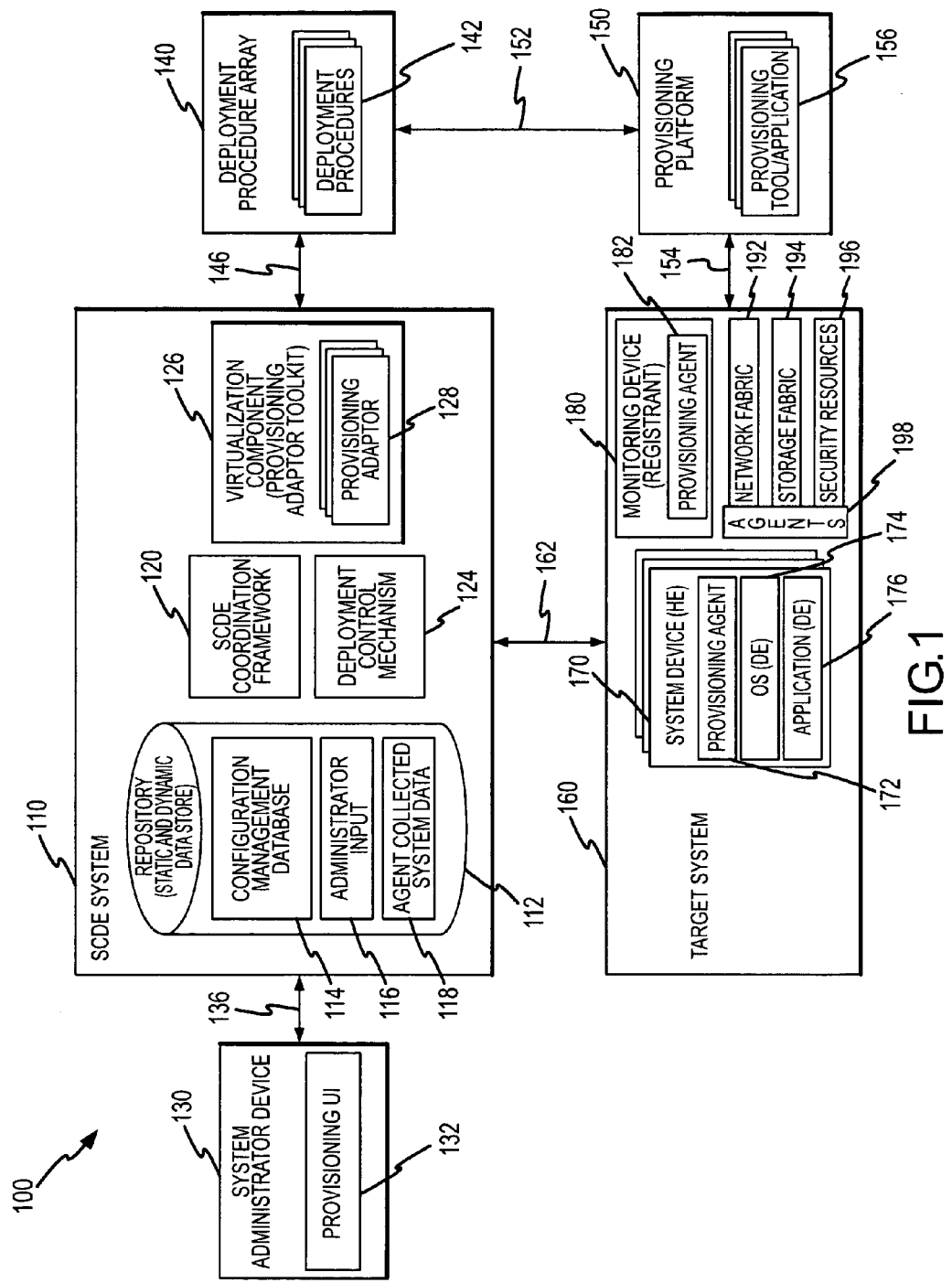
FIG. 1 illustrates an embodiment of a provisioning system according to the present invention shown in simplified block form.
Figure 2:
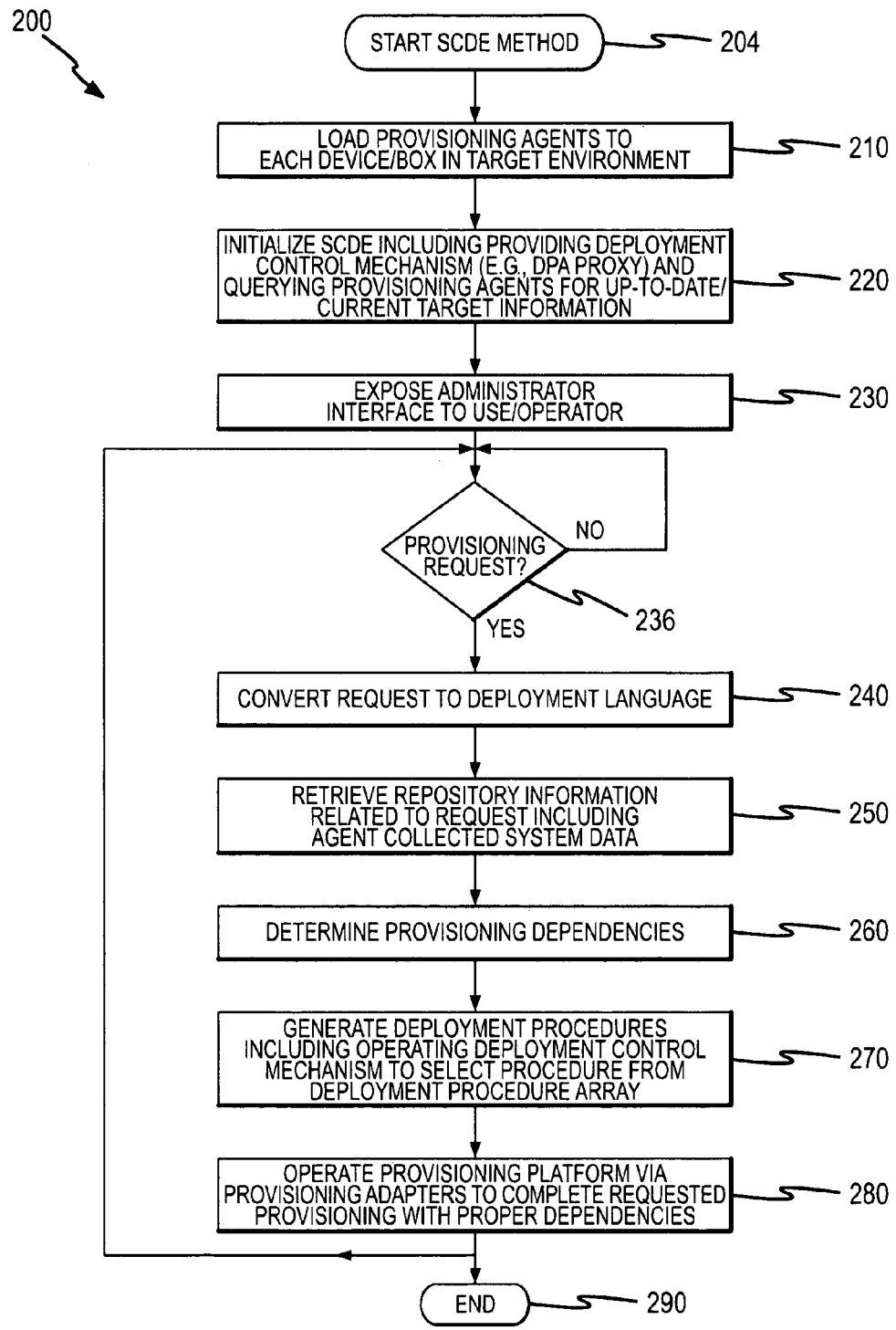
FIG. 2 shows a flow diagram for a service configuration and deployment method according to one embodiment of the invention such as may be performed during operation of the provisioning system of FIG. 1.

To fully explain features of the invention, the following description begins with a discussion of an exemplary provisioning system and its operations with reference to FIGS. 1 and 2. This description is followed by additional discussion of each aspect of the SCDE and its use stressing the features that facilitate virtualization of the provisioning platform and the use of remote agents to gather current target environment or system data.

To practice the invention, the computer and network devices may be any devices useful for providing the described functions, including well-known data processing, data storage, and data communication devices and systems, such as application, database, web, blade, and entry level servers, midframe, midrange, and high-end servers, tape and disk storage devices, personal computers and computing devices including mobile computing and electronic devices with processing, memory, and input/output components and running code or programs in any useful programming language, and server devices configured to maintain and then transmit digital data over a wired or wireless communications network (i.e., any device that can communicate with the SCDE). Data, including transmissions to and from the elements of the system 100 and among other components of the network/systems shown in the figures typically is communicated in digital format following standard communication and transfer protocols, such as TCP/IP, HTTP, HTTPS, FTP, and the like, or IP or non-IP wireless communication protocols.

FIG. 1 illustrates a provisioning system 100 in which a service configuration and deployment engine (SCDE) system 110 is provided to coordinate provisioning functions across all portions of a target system 160 as well as providing an access point to a system administrator or other control or policy based network management system 130 to a virtualized provisioning platform 150. As shown, the system administrator device or client 130 (e.g., a desktop work station, laptop, or other computing device) is linked to the SCDE system 110 with connection 136, which may be any digital data communication such as a LAN, a WAN, the Internet, or the like. A provisioning user interface (UI) or SCDE console 132 is accessible via the device 130 and allows an operator or other control system of the device 130 to input provisioning requests, such as via markup language commands such as eXtensible Markup Language (XML) inputs, via Web services, or other user-friendly input methodologies. In one embodiment, the provisioning interface 132 is used to expose an XML interface to a system administrator who is prompted for administrator, control, or network based policy management system input 116, such as service requirements, service or business policies, security policies, and the like, that is stored in memory or the logically centralized, potentially physically distributed repository 112 of the SCDE system 110 for later use in provisioning.

The system 100 includes the SCDE system 110, which is typically provided on a separate server or device from the administrator device 130 and other components such as the deployment procedure array 140 and provisioning platform 150, although this is not a requirement. The SCDE system 110 (as will become clear from the discussion of FIGS. 3-7) acts as a virtualization layer between the design automation features of the provisioning interface 132 and the provisioning platform 150 to facilitate selection of and communication with provisioning tools/applications 156 provided in the provisioning platform 150. The SCDE system 110 is also useful for obtaining current information useful in successfully provisioning a target system 160 and using that collected information (shown as agent collected system data 118) along with administrator input 116 and configuration management database information 114 in the logically centralized, potentially physically distributed repository 112 to determine and then later manage (or insure compliance with) dependencies among the various provisioning steps or actions (e.g., selection of an OS may need to be performed prior to selection of a version of an application or the provisioning or configuration of a network device may be dependent upon provisioning or configuration of a computer, network, or data storage device and so on). Local dependencies related to patches, OS level, resource availability, and the like. In most embodiments, the dependencies that are managed are most commonly from an application to server to network and storage.

To this end, the SCDE system 110 includes a repository 112 that acts to store relatively static information including configuration or knowledge management database 114 and dynamic information including administrator input 116 such as that provided via provisioning interface 132 or otherwise and agent collected system data 118. The agent data 118 is collected by provisioning agents or adaptors 172, 182, 198 provided in each box or device (or associated with each component) of a target system or environment 160. The repository 112 may include information for controlling provisioning tools/applications 156, for configuring and managing services in the target environment 160, and resource information related to the target environment 160. For example, a service may be described as a service pattern or with a service profile, and these patterns/profiles may be stored in the configuration management database 114.

The SCDE system 110 further includes SCDE framework 120 for coordinating operation of the system 110 with administrator device 130, deployment procedure array 140, and provisioning platform 150 to properly provision target system 160 in response to provisioning requests from provisioning interface 132 over link 136. The SCDE coordination framework 120 controls provisioning interface 132 and acts to process provisioning requests, which may be in a markup language or other form, to generate a deployment or description language-formatted input to the repository 112. For example, the inputs from the provisioning interface 132 may be converted into service description language (SDL) format which is a standardized format for describing service requirements and in turn from SDL to N1 description language (N1DL) format which is based on micro-architecture patterns of various components that define a service in a N1 Grid Computing environment, with N1DL (at least in one embodiment) being accepted as input by provisioning adapters which in turn communicate in formats or based on protocols expected by the provisioning tools/applications 156 (such as instructions in a particular markup language (e.g., Farm Markup Language (FML), Wiring Markup Language (WML), Monitoring Markup Language (MML), or a deployment markup language), or the like such as may be native to a tool such as NPS or the like). Of course, while N1DL may be represented as SCDE commands in some embodiments, the invention is not limited to using only N1 provisioning tools and many other provisioning tools may be utilized. The operation of the SCDE coordination framework 120 is discussed in more detail with reference to FIGS. 3-7.

A deployment control mechanism 124 is provided in the SCDE system 110 for interacting with a deployment procedure array 140 that is provided in another device (in this embodiment) linked via link 146. The deployment procedure array 140 includes a set of deployment procedures 142 that provide the intelligence or know-how to execute various activities that, collectively, can satisfy a user, control device, or policy based network management system request from provisioning interface 132. The mechanism 124, as discussed with reference to FIGS. 3-7, may be proxies for the array 140 and procedures 142 provided on the SCDE system 110. In some embodiments, the SCDE coordination framework 120 choreographs the request execution by invoking the correct set of procedures 142 within the deployment array 140 via deployment control mechanism 124. These procedures 142 then carry out the work necessary to satisfy the request from the provisioning interface 132 in target system 160.

Each of the procedures 142 may delegate some or all of its tasks to provisioning tools/applications 156 in a provisioning platform 150 that is linked via link 152. For example, the provisioning tools/applications 156 may be third party applications such as NIPS, CenterRun, eJacent, custom solutions including UNIX scripts and Java classes, or the like. The array 140 and provisioning platform 150 may be on separate devices (e.g., servers) with a link 154 to target system 160 or be provided on a single device/server such as one in the target system. For example, the array 140 and applications 156 may reside within the tier/server where a deployable entity (DE) is being deployed such as on system device 170 of target system 160. The provisioning platform 150 is responsible for physical control over hardware resources in target system 160. For example, the platform 150 may be responsible for control functions over all server resources 170, network devices 192, storage systems 170, 194, and security devices 196 of target system 160. The provisioning platform 150 is typically responsible for the initial server (and other device) provisioning process and handling the upgraded operating environment images. A monitoring device or system 180 may be provided in target system 160 or separately to handle monitoring of the components of the target system 160 and provide a negative feedback loop for system 100 to provide enhanced control of target system 160 and enhance future operation control and provisioning efforts.

The SCDE system 110 further includes a virtualization component 126 that provides for interchangeability of the provisioning platform 150 and provisioning tools 156. For example, the component 126 or "provisioning adaptor toolkit" may include a number of provisioning adaptors that enable integration of the platform 150 technologies (i.e., tools/applications 156) into the system 100. Each of the adaptors 128 provides or implements an interface to one or more of the provisioning tools/applications 156 that enables communication of the generated provisioning request (or instruction set with its dependencies) to the various tools/applications 156, and this important virtualization of the provisioning tools/applications 156 is explained in more detail with reference to FIGS. 3-7. In general, though, the adaptors 128 are used to communicate and translate the various languages (such as the markup languages or deployment markup language described above) into the build and registration instructions/processes understood or expected by the tools/applications 156 of provisioning system or platform 150. In one embodiment, the adapters 128 are linked via a common message bus or some other publish/subscribe mechanism (not shown). In one example, the adaptors 128 speak N1DL (for example only, not as a limitation) via XML and generate locally the various languages and workflow initiation steps required by the tools/applications 156 and that provide automation of the build and control processes. The adaptors 128 may also be able to report status back to the SCDE coordination framework 120 as well as final build details useful for producing resource and instance profiles stored in the repository 112 (such as part of the configuration management database 114).

The target system 160 is intended to represent any single or multiple computer systems, network systems, or storage systems that may be a target of a provisioning operation or require notification of or changes as a result of a provisioning operation, such as the loading of one or more applications, an OS, patches, or the like. As shown, the target system 160 is linked via link 162 to the SCDE system 110 and includes various system devices 170 (such as servers, communication devices, computer stations/devices, and the like), a monitoring device or system 180, network fabric 192, storage fabric 194 (e.g., SAN resources or other networked storage devices), and security resources 196. To provide current data 118 in repository 112 to facilitate dependency determination and coordination by SCDE coordination framework 120, each box or device in system 160 includes a provisioning agent 172, 182, 198 that acts to respond to queries from SCDE coordination framework 120 to provide data on what devices are plugged into system 160 and provide configuration, capability, and other data useful for successfully provisioning to that particular device or hardware component.

As will become clear, there are generally three modes of operation for the managed services in the target system 160. Each service generally begins as a deployable entity (DE) which may be provisioned or deployed to an SCDE-resolvable component, e.g., an OS, an application, a configuration file/configuration parameter set, and the like. This is shown in target system 160 with OS 174 and applications 176 that are deployed to the system device or server 170. Another mode of operation is a hosting environment (HE), which may be a device (e.g., a server, SAN, network switch or the like) or another managed service (e.g., an OS, a server application, or the like), and this is shown as system device 170 hosting OS 174 and applications 176. A third mode of operation is as a registrant which is typically an external component as shown with monitoring device 180, such as a notify, monitoring, DNS, or other system/service, that registers to receive notifications from other actions or by other managed services, such as DEs or HEs.

FIG. 2 illustrates a SCDE method 200 such as may be performed by operation of the system 100 of FIG. 1. As shown, the method 200 starts at 204 such as with the identification of a target system 160 for which it is desired to automate provisioning and service configuration. A number of provisioning tools/applications 156 may be selected for a provisioning platform 150 that may be provided separately or as part of the target system 160. At 210, the method 200 continues with loading provisioning agents 172, 182, 198 at each (or select) boxes or devices in the target system 160. At 220, the SCDE system 110 is initialized which may include providing a deployment control mechanism 124 (e.g., obtaining deployment procedure array proxies) and also querying the agents in target system 160 to obtain up-to-date or current target information that is stored as agent collected system data 118 in logically centralized but potentially physically distributed repository 112. Hence, the method 200 provides for feedback into the system 100 by providing a dynamic side to the store 112 rather than relying solely on static data. One value in the method 200 (and system 100) is that the technique knows where to get quality information, i.e., query hardware or system 160 components directly.

At 230, the method 200 includes exposing to an operator, administrator, control device or policy based network management system the virtualized (e.g., via provisioning adaptor toolkit 126 and coordination framework 120) provisioning platform 150 via a provisioning interface 132. For example, the administrator provisioning interface 132 may be a GUI or the like that exposes an XML interface to the user or alternatively, may expose a Web services interface or provide for RMI, Jini, or other calls that make up a provisioning request from the provisioning interface 132 and may also be useful for inputting administrator input 116 for use in defining service requirements. The method 200 continues at 236 with determining whether a provisioning request is received and if not repeating step 236.

When a request is received, the method 200 continues at 240 with the SCDE coordination framework converting the request to a more accepted format for service deployment such as a particular markup language or a deployment language. At 250, information is retrieved by the framework 120 from the repository 112 that is related to the request and useful for effective provisioning. Typically, data is retrieved from the configuration management database 114 and administrator input 116 (such as business or security policies) may be retrieved from the repository 112. Additionally, agent collected system data 118 is retrieved (and in some embodiments, step 220 is performed later in method 200 or at least the querying of the provisioning agents in target system 160 is performed after a provisioning request is received to provide current data).

At 260, the SCDE coordination framework 120 choreographs deployment procedures including determining dependencies associated with the provisioning request and resulting build or deployment functions. For example, this may involve determining an order in which provisioning tools/applications or deployment procedures are performed and in some cases, with what input parameters/data. At 270, the SCDE coordination framework 120 (in conjunction with deployment control mechanism 124 or DPA proxies) acts to generate deployment procedures including selection of deployment procedures 142 from the deployment procedure array 140. At 280, the selected procedures 142 are performed to complete the automated provisioning on target system 160. The procedures 142 typically delegate or implement tools/applications 156 of provisioning platform 150 and in this regard, the provisioning adaptors 128 are utilized as necessary by the coordination framework to communicate and interface with each of the tools/applications 156. During 280, the SCDE coordination framework 120 may act to monitor and insure compliance of the procedures 142 and provisioning platform 150 with earlier defined provisioning dependencies (or this may be built into the generated deployment procedures from step 270 which may be supplemented with verification by coordination framework 120 during or after deployment by provisioning platform 150). The method 200 may end at 290 or continue at 236 with waiting for a next provisioning request.

Figure 3:
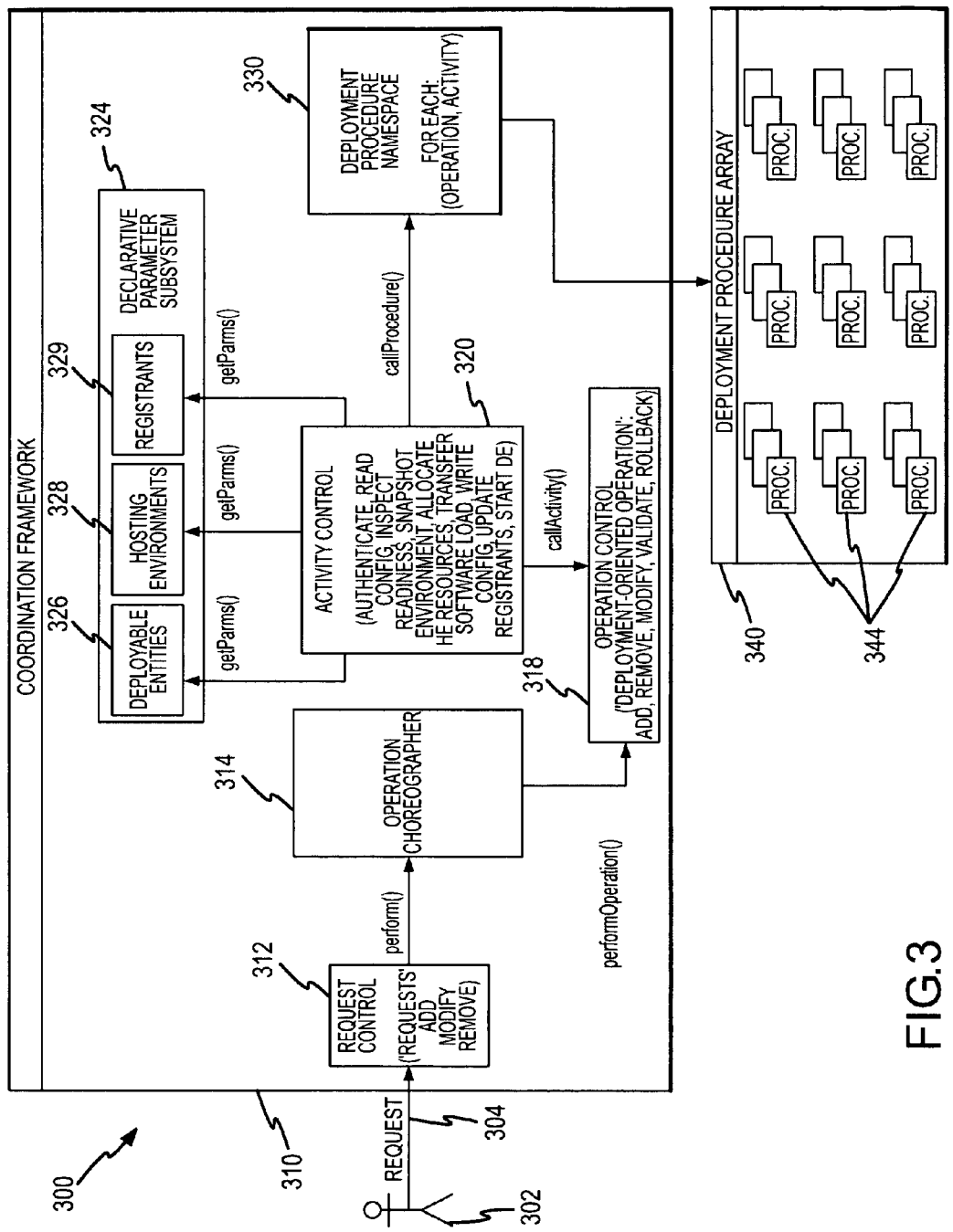
FIG. 3 illustrates an embodiment of a provisioning system showing in more detail a service configuration and deployment engine (SCDE) coordination framework component of the invention and its processing of provisioning requests.

FIG. 3 illustrates another embodiment (or way of illustrating key features of the invention) of the invention showing a provisioning system 300 that is partitioned into a coordination framework 310 and a deployment procedure array (DPA) 340, which is coordinated by the coordination framework 310. The coordination framework 310 accepts deployment-oriented (e.g., provisioning) requests 304 from users 302 of the SCDE, such as via a SCDE console or UI. The coordination framework 310 parses the requests 304 and then, choreographs the execution of various activities that satisfy the requests 304. The DPA 340 contains procedures 344 that know how to execute various activities that collectively can satisfy a user request 304. The coordination framework 310 choreographs the request execution by invoking the correct set of the procedures 344 within the DPA 340, and this subset of procedures 344 then carry out the work necessary to satisfy the request 304. Each of these procedures 344 in the DPA 340 may in turn delegate to another provisioning application, such as, for example purposes only, N1 Grid SPS or JumpStart, in order to accomplish its work. Typically, the coordination framework 310 resides and operates on one tier or server while the DPA 340 and any provisioning applications (not shown in FIG. 3) reside within the tier or server where the target deployable entity is being deployed.

In operation, managed services, also known as managed service entities (MSEs), are entities that are managed by and whose deployment is controlled by the provisioning system 300. These entities can be installed, deployed, provisioned, observed, started, stopped, suspended, resumed, queried, and/or otherwise managed by the system 300. A managed service can at various times take on one of the following three roles in the SCDE environment (and as shown in FIG. 1): deployable entity (DE), hosting environment (HE), and registrant. Deployable entities are any managed software entity that can be deployed, e.g., into a hosting environment. The coordination framework 310 defines a specific packaging mechanism for one or multiple deployable entities, which is configurable. A hosting environment is any environment that behaves as an operating container for a managed service. In the system 300, a DE is deployed into an HE, which may be a hardware component or a managed software entity, and thus, the system 300 is configured such that any managed service can be an HE as well as a DE. A registrant is a managed service with which other managed services can register. The idea is that when a DE is deployed into an HE it also informs various other managed services of its existence. Each managed service is responsible for defining its own set of registrants, which may be defined in a repository entry for each managed service. In many cases, registrants are infrastructure-oriented software packages that measure or monitor the environment. Some examples of possible registrants are: OS, Web server, a database management server, storage, DNS, threshold, visibility, load balancers, a hardware database, change management, firewall rules, NAT rules, and other packages (such as SunCluster, S9RM, BMC, SLA, TroubleTicket Application, ClearCase, or the like).

The deployment procedures 344 in DPA 340 are each a procedure that performs deployment actions for a specific activity of a specific operation on behalf of a deployable entity. For example, one of the deployment procedures 344 may perform deployment actions related to the pair (Add, Transfer Software Load). This procedure 344 would be associated with the "Transfer Software Load" activity of the "Add" operation. When the coordination framework 310 needs to cause work to be executed, there is a procedure 344 provided in DPA 340 that knows how to accept the required parameters to perform such work (e.g., the name of the software load, where it is located, and where to transfer it to) and then, to actually perform the work. Such a procedure, may be handed via a third-party provisioning tool or application (such as CenterRun, N1PS, or the like).

The system 300 provides a mechanism to delegate these responsibilities to these types of provisioning applications or to custom-developed UNIX scripts or Java classes that may be used as provisioning tools/applications. For each "Operation, Activity" combination, the system 300 supports individual deployment procedures. Also, the source of these procedures can be mixed. More specifically, each "Operation, Activity" pair can have its deployment procedure implemented uniquely. For example, some deployment procedures can be handled by a provisioning application (e.g., CenterRun), some procedures by another provisioning application (e.g., NIPS), and others by other provisioning applications (e.g., UNIX scripts and/or Java classes or the like) or some combination of such provisioning applications. The deployment procedures 344 selected from the DPA 340 by the coordination framework 310 may also be varied based on the managed service entity (MSE) or by categories of MSE. A mechanism for defining MSE categories for the purpose of controlling which deployment procedures are applied to them may be defined by the coordination framework 310, which may work in a manner similar to file types in an operating system.

As shown, a user 302 inputs a provisioning request 304 to the coordination framework for processing. Generally, the types of request 304 that the coordination framework 310 can process are requests that when processed result in performance of deployment-oriented operations within a target system, e.g., a data center. The request control 312 receives and initially processes the request 304. The request control 312 of one embodiment is capable of responding to requests that specify a target environment and the type of deployment or provisioning action (e.g., add, modify, remove, or the like) and also specify the deployable entity, which typically refers to a software package that is intended to be operated on by the framework 310. The request control 312 passes the received request to the operation choreographer 314 of the framework 310, which acts to choreograph received requests 304 and their processing in the framework 310.

In order to execute requests 304, the coordination framework 310 translates them into executable responsibilities and then coordinates the execution of these responsibilities. The operation control module 318 acts to define a set of deployment-oriented responsibilities that is implemented by the framework 310. These are called deployment-oriented operations and include: validate, remove, add, modify, and rollback. The operation control 318 translates a request from the operation choreographer 314 into a set of one or more of these operations. For example, an add request may be mapped into a validate, add, and rollback set of operations while a modify request may be mapped into a validate, modify, and rollback set of operations. A remove request may be mapped into a validate, remove, and rollback set of operations.

The activity control module 320 is provided as each deployment-oriented operation executes several specific types of responsibilities and these executions form "activities" within a specific operation. The activity control 320 maps the operation or sets of operations to such activities including: authenticate, read configuration, inspect environment, snapshot environment, allocate HE resources, transfer the software load, write configuration, update registrants, and start DE. Activity control module 320 acquires the necessary information from a repository, which may include the declarative parameter subsystem 324 that is shown to include parameters or other information (e.g., configuration information, agent collected data, and the like) for deployable entities 326, for hosting environments 328, and for registrants 329. The acquired information may pertain to a DE, an HE, and/or a registrant for the specific operation or invocation (e.g., an operation/activity pair).

The activity control 320 typically also invokes a procedure delegation coordination module in order to choreograph the activity or this may be accomplished with the activity control module 320. For each operation, the activity control module 320 delegates (or performs itself) to the procedure delegation coordination module the responsibility of determining which deployment procedure 344 to execute for the operation. It does so by utilizing the deployment procedure namespace mechanism 330 to locate and invoke the proper procedure 344 from deployment procedure array 340. The activity control 320 and/or the procedure delegation coordination module manage the workflow among these actions, with some actions optionally being performed in parallel.

The deployment procedure namespace 330 is a mechanism adapted to facilitate location and execution of deployment procedures 344 in array 340. A human operator 302 typically enters a deployment or provisioning request 304. The request control module 312 breaks the request 304 down into a sequence of internal operations. The operation control module 318 then breaks each of these internal operations down into a series of internal activities. Regarding the namespace 330, it is important that each of these operation/activity pairs is associated with one logical deployment procedure 344. It is the responsibility of the operation choreographer 314 (or activity control 320) to locate and invoke each of these deployment procedures 344 at the correct time. A purpose of the namespace 330 is to provide a mechanism by which the operation choreographer 314 (or activity control 320) can locate and invoke (or execute) each of these deployment procedures 344. In other words, the namespace 330 forms a logical namespace for the set of all deployment procedures 344. In one embodiment, the namespace 330 uses an array structure to organize this logical namespace, with each deployment procedure 344 being identified by its operation/activity pair, i.e., the first dimension of the array structure of the namespace is the name of the operation and the second dimension of the array structure is the activity.

The deployment procedure array (DPA) 340 is an array of deployment procedures 344, such as those installed within a specific instance of SCDE system or associated with a particular coordination framework 310. There is typically at least one procedure 344 for each operation/activity pair within the DPA 340. Each procedure 344 may invoke another application (e.g., a third-party provisioning application such as CenterRun) in order to carry out the responsibility of the operation/activity pair on the target system. As discussed with reference to FIGS. 1 and 2, the provisioning adaptor toolkit (PAT) when used in association with the coordination framework 310 and DPA 340 provides a mechanism for integrators to bind various packages with the appropriate operation/activity pair (e.g., to handle the interfacing function between the framework 310 and the procedures called or invoked by procedures 344). More than one binding can be provided for a given operation/activity pair. The DPA 340 uses the DE-related parameters 326 that are passed with the invocation of a procedure 344 to determine which of the bindings to invoke. The DPA 340 generally resides in a remote tier from the coordination framework 310 that generally must remotely call it. To facilitate this a DPA proxy (DPAP) may be utilized (as shown as deployment control mechanism 124 in FIG. 1) which may reside in the same tier as the coordination framework 310 and is directly invoked by the framework 310. It is the responsibility of the DPAP to insure that the remote communication between the coordination framework 310 and the actual DPA 340 takes place reliably. To the coordination framework 310, the DPAP (or control mechanism 124 of FIG. 1) looks like the DPA as it implements the deployment procedure namespace 330 as its interface. In some embodiments, the DPAP is implemented as an array of "remote pointers" to the DPA 340.

The declarative parameter subsystem 324 may be referred to as a repository (such as repository 112 of FIG. 1) and includes a collection of parameters that are supplied (or agent collected) to customize, tailor, and control the operation of the coordination framework 310 (and an SCDE system including the framework 310). The modules of the framework 310 and DPA 340 are typically controlled by specific parameters. The subsystem 324 is the mechanism by which policies are implemented and such parameter entries may include service interface descriptions, software load requirements, container resource attributes, and the like.

Figure 4:
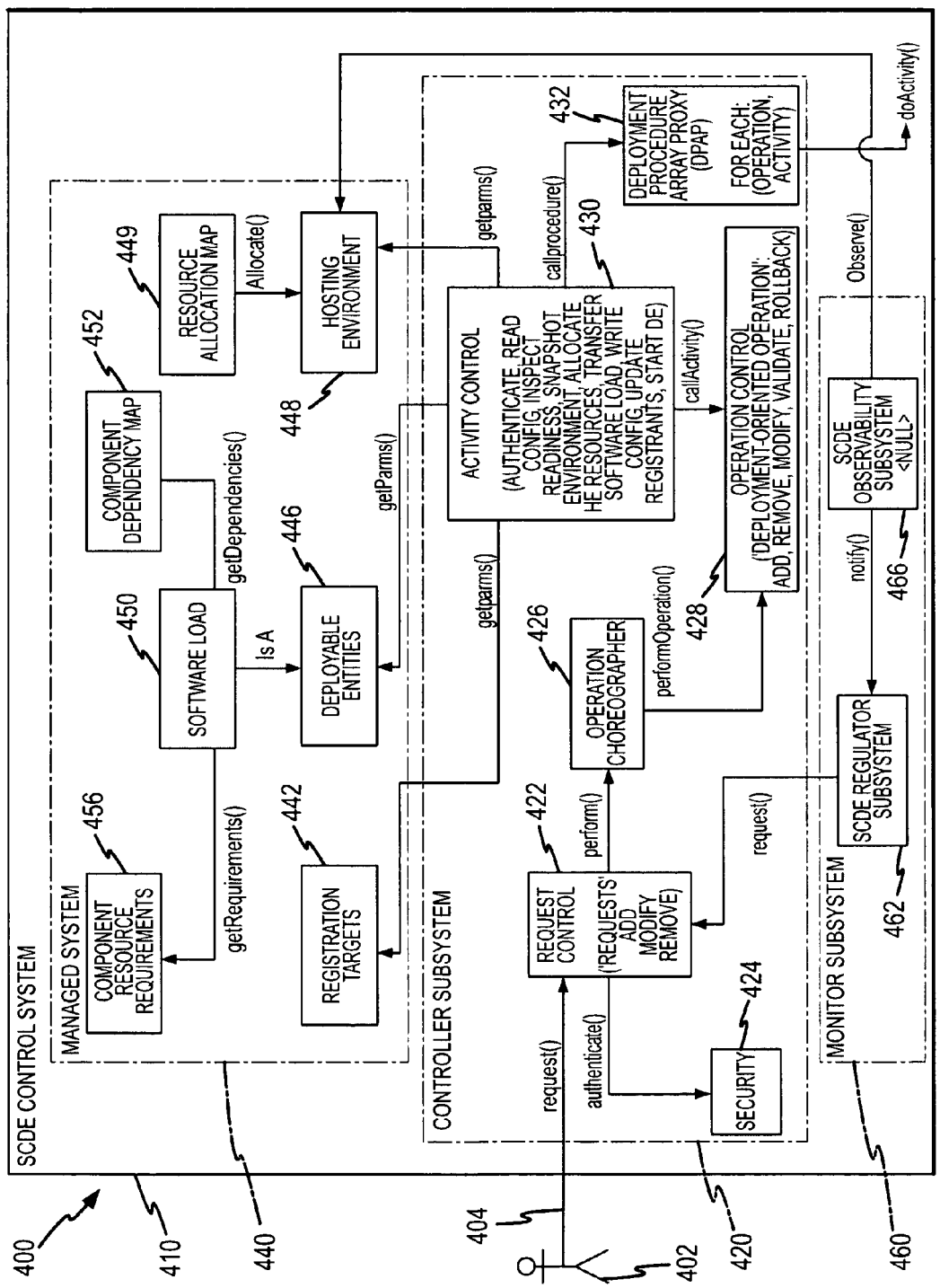
FIG. 4 illustrates another embodiment of a provisioning system of the invention showing the SCDE features of the invention as a cybernetic control system.

The SCDE system and its features can be organized or thought of as cybernetic control system. This is shown in FIG. 4 which illustrates a SCDE control system 410 that takes input requests 404 from a user or operation 402 (such as via a user interface or SCDE console 132 as shown in FIG. 1). The SCDE control system 410 is organized into and includes a managed or target system (such as a data center) 440, a controller or coordination framework 420, and a monitor subsystem 460. The managed system 440 includes a number of managed service entities (MSEs) including registration targets 442, deployable entities 446, and hosting environments 448. The hosting environments 448 allocate and manage a resource allocation map 449 for the managed system 440. The deployable entities 446 may be made up of a software load 450 and can be used directly or through provisioning agents to obtain component resource requirements 456 and to determine dependencies such as via a component dependency map 452.

The controller or coordination framework 420 includes a request control 422 for processing incoming provisioning requests 404 and requesting authentication from a security module 424. The request control 422 passes the request information to the operation choreographer 426, which in turn calls the operation control module 428 and activity control module 430. The DPA proxy (DPAP) is called by the activity control module 430 for each operation/activity pair to perform the activity via a provisioning tool/application (such as provisioning tool/application 156 of FIG. 1). Although not shown in FIG. 4, the controller 420 may further include a procedure delegation coordination module (or this may be performed by the operation choreographer), a DPA and its procedures, and a declarative parameters subsystem or repository (as shown in FIG. 3).

The monitor subsystem 460 is shown to communicate with the managed system 440 such as via the hosting environment 448 and to provide feedback/requests to the controller 420 such as via the request control module 422. The monitor subsystem 460 is shown to include an observability subsystem 466 along with a regulation subsystem 462. The observability subsystem 466 is responsible for observing the behavior of the subsystems of the managed system 440 and reporting the behavior to the regulation subsystem 462. The regulation subsystem 462 then makes optimization decisions regarding the control of the system 440 and invokes SCDE requests or provisioning requests on the controller 420, such as via request control 422, in order to control the behavior of the SCDE control system 410 and specifically, the managed system 440. The SCDE control system 410 forms a cybernetic negative feedback loop including a system 440 being controlled, a monitor 460 that observes the actual behavior of the system 440 and makes decisions about the intended future behavior of the system 440, and a controller 420 that changes the behavior of the system 440.

At a high level, the general flow of processing by the SCDE control system 410 can be described as beginning with the request control 422 accepting a request 404 from a user 402

(e.g., a systems administrator) to deploy a managed services entity in the role of a deployable entity. The request control 422 parses the request into one or more operations and calls the operation choreographer 426, which acts to read a workflow graph for the specific operation from the repository (not shown in FIG. 4). In some embodiments, the workflow graph directs the concurrent processing of the activities of the specific operation in a manner that considers and enforces the dependencies of the activities on completion. For each activity, the operation choreographer 426 invokes operation control 428, which invokes activity control 430 for each activity of each operation. Activity control 430 looks up pertinent parameter information in the repository (not shown in FIG. 4) regarding the deployable entity, the operation, and the activity. The activity control 430 then invokes the appropriate cell for the operation/activity pair within the DPAP (as discussed with reference to FIG. 3) passing the appropriate parameters along with the invocation. For each such activity, activity control 430 invokes the appropriate remote procedure reference within the DPAP, which then invokes its corresponding deployment procedure within the DPA (not shown in FIG. 4) within the target or managed system 440 environment.

Figure 5:
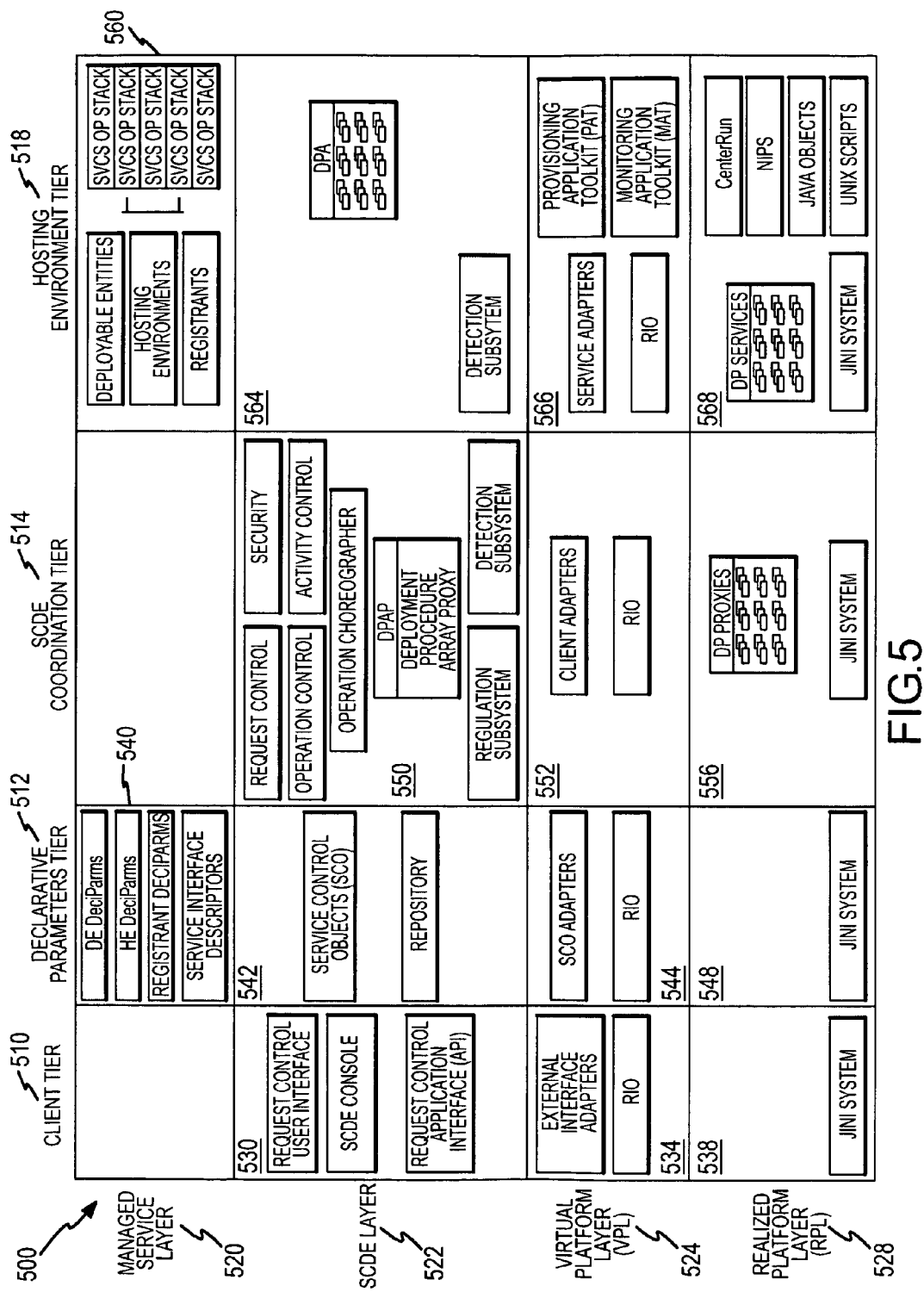
FIG. 5 illustrates a provisioning system of the invention illustrated to shown the layers and tiers of the provisioning system (e.g., an distributed platform overview of an embodiment of an SCDE)

In practice, the SCDE subsystems and components of the invention are distributed across multiple tiers within a target system, such as a data center, with various layers of abstraction being used to implement virtualization within a SCDE system (such as system 100 of FIG. 1). A tiered and layered SCDE system 500 is shown in FIG. 5 that includes four tiers: a client tier 510, a declarative parameters or repository tier 512, an SCDE coordination tier (or coordination framework tier) 514, and a hosting or target environment tier 518 and four layers: a managed service layer 520, an SCDE layer 522, a virtual platform layer (VPL) 524, and a realized platform layer (RPL) 528. The layers and tiers intersect to create a number of non-empty cells 530, 534, 538, 540, 542, 544, 548, 550, 552, 556, 560, 564, 566, and 568 that include the features and components of the SCDE systems of the invention (with many discussed in FIGS. 1-4).

The layers of the SCDE system (or distributed platform overview) 500 represent levels of abstraction with higher layers being more abstract than lower layers. Higher layer responsibilities are typically mapped into responsibilities of lower layers. Higher level layers map their responsibilities into those of lower layers and then, invoke the lower layer responsibilities in order to carry out those of the upper layer. This architecture allows the replacement of certain lower layers without breaking upper layers. In particular, the system 500 is designed to enable the RPL to be replaceable. For example, the distributed communications platform may originally be implemented using Jini systems in the RPL, but if Web services are later desired, the RPL can be replaced with a Web services implementation and a new VPL may be provided that invokes Web service interfaces rather than Jini interfaces. VPL layer adaptors encapsulate all code that directly invokes the RPL to achieve effective communications (see for example the PAT in cell 566 that interfaces with DP services in the RPL cell 568). The interfaces that any adaptor in the VPL 524 exposes to the SCDE layer, however, will be the same regardless of which type of platform actually resides in the RPL 528, which minimizes the amount of code that needs to be changed within the SCDE system 500, and thus, interchangeability is accomplished at least in part through the use of the VPL adaptors.

The following discussion describes each of the layers of the SCDE system 500 in more detail. The managed services layer 520 contains managed services that operate at runtime in the data center or target system environment. Each of such services can take on the role of a deployable entity, a hosting environment, or a registrant as shown in cell 560. The SCDE layer 522 includes many of the SCDE system components as described with reference to FIGS. 1-4 as can be seen from cells 530, 542, 550, 564, including the SCDE console, the repository, the components of the coordination framework including the DPAP, and the deployment procedures array. The VPL 524 provides virtualization above any type of distributed computing technology, services provisioning solutions, or other platforms. This allows the SCDE system 500 to be implemented above a variety of platforms and for a variety of technology implementations to be "plugged into" the SCDE system 500. The VPL 524 houses the adaptors that make polymorphism possible including the adaptors provided as part of the PAT in cell 566.

The RPL 528 contains the realization platforms and technologies for some of the major functions of the SCDE system 500. Essentially, the SCDE 500 is a coordination and virtualization framework that sits on top of the RPL 528 and its platforms, such as DP services in cell 568. The SCDE 500 via VPL 524 presents a common set of interfaces into all of the platforms of the RPL 528 and coordinates their activities as it delegates to them in order to carry out the work of data center or target system management. Generally, the SCDE system 500 provides a framework into which these "realized platforms" are pluggable allowing their interchange or replacement in a relatively easy manner. The types of realized platforms supported by the SCDE 500 may be thought of as falling into three categories: provisioning platforms (such as NIPS, CenterRun, eJacent, and custom solutions including UNIX scripts and Java classes), monitoring systems (such as SunMC, BMC Patrol, and the like), and distributed computing middleware (such as Jini, Web Services, CORBA, JXTA, and the like) that enable a computer that is a network of computers to be controlled and managed by the SCDE system 500 via a variety of technologies.

The tiers of the SCDE system 500 organize the modules of the SCDE system 500 into distributable functions. The client tier 510 holds user console applications that are supplied with the SCDE system 500 as shown in cell 530 in the SCDE layer 522. Also, the client tier 510 holds applications that access the SCDE controller or coordination framework such as shown in cells 530, 534. The declarative parameters tier 512 contains the "repository" functions of the SCDE system 500 and includes any policies, parameters, or other inputs that various user roles may provide to direct the control of the SCDE statically, as shown in cells, 540, 542. The SCDE coordination tier 514 contains the principle logic (e.g., an N1 control plane portion or the like) of the SCDE system 500. In one embodiment, the entire coordination framework of the SCDE system 500 resides within the SCDE coordination tier 514 as shown in cells 550, 552, 556 including the operation choreographer, the DPAP, and the DP proxies. The hosting environment tier 518 contains the components that reside on the target system or environment, which may include any systems to which a target deployable entity is to be deployed, the hosting environments into which a DE is to be deployed, and/or any entities to which a DE is to be registered (as is shown in cell 560). The tier 518 also includes an distributed portions of the SCDE system 500 that are useful for interoperating between the SCDE coordination tier and the hosting environment tier 518, which may include the DPA shown in cell 564, communication middleware involved in the RPL 528 as shown in cell 568, and, significantly, the PAT and provisioning adaptors provided in cell 566 and provisioning services provided in cell 568.

One of the important aspects of the SCDE system 500 is providing virtualization of the RPL 528 and its components such as the provisioning or DP services provided in the cell 568. This is generally achieved with the PAT of cell 566 by providing provisioning or service adaptors as the VPL 524 represents an adaptor or "wrapper" that decouples most of the SCDE code (that which is in the SCDE layer 522) from the underlying RPL 528. Thus, adaptors or adaptor classes that encapsulate calls between the SCDE layer 522 and the RPL 528 implement interfaces as discussed below. The idea is to encapsulate all SCDE code that talks directly to the RPL (such as to DP services in cell 568) into a small set of classes. This reduces the number of places where the code changes if one RPL (e.g., Jini, CenterRun, or the like) is switched for another (e.g., to Web Services or a customer-supplied provisioning procedure). Then, all of the SCDE code that contains or encapsulates direct RPL references becomes the VPL 524.

In one embodiment, the PAT provides VPL interfaces whose implementations are "wrappers" of the underlying RPL code (such as DP services). Such provisioning and other adaptors or wrappers encapsulate the RPL-specific code that directly calls down into the RPL 528 to make a remote invocation happen. For example, adaptors or objects in the VPL 524 wrap calls to the underlying RPL 528 to look up a remote reference and to invoke its methods.

Figure 6:
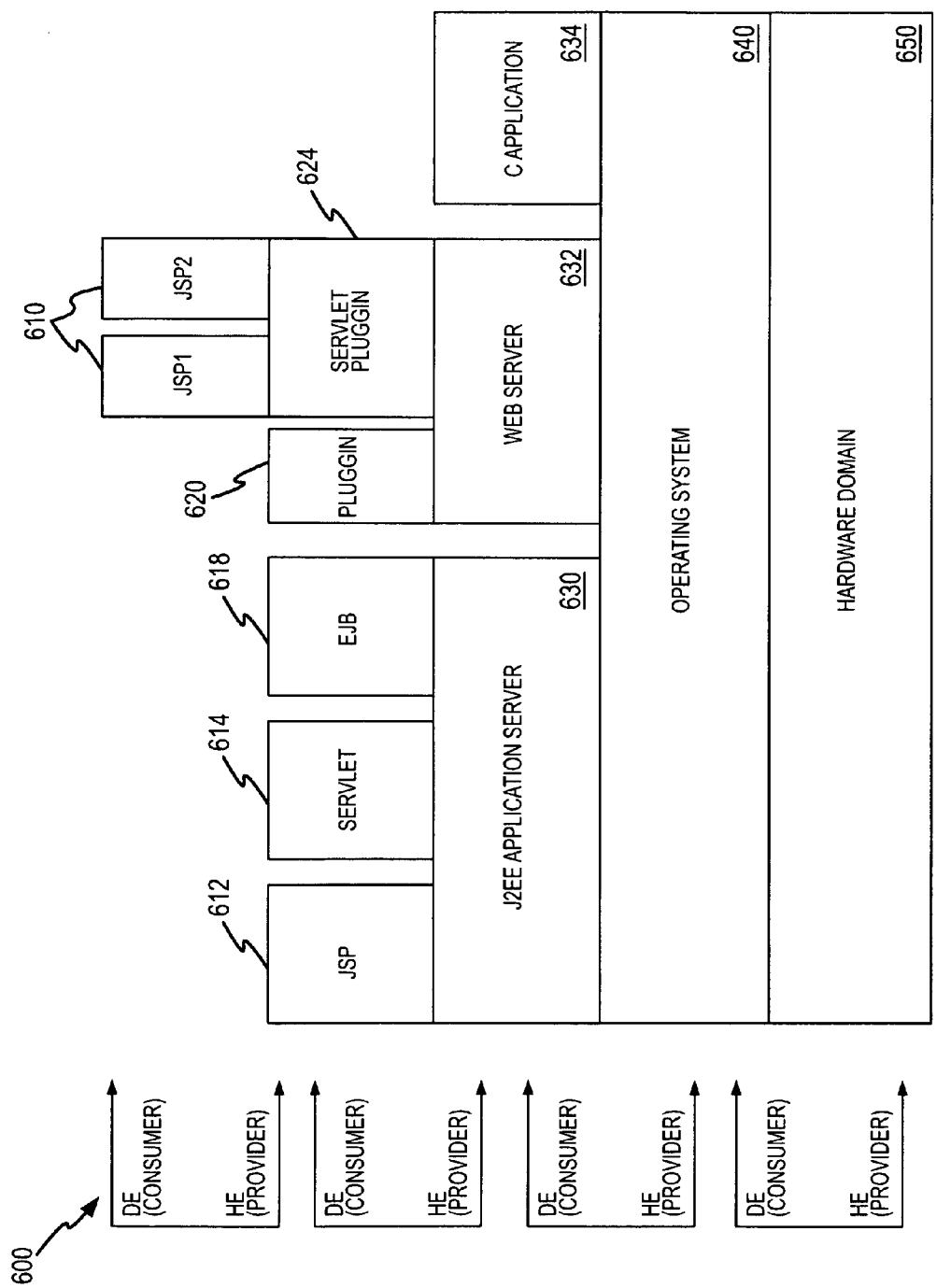
FIG. 6 illustrates in simplified form a runtime services operating stack in one embodiment of a provisioning system of the present invention showing the relationship of deployable entities (DEs) and hosting environments (HEs)

FIG. 6 illustrates a runtime service operating stack 600 that may occur during practice of the invention, such as during operation of the system 100 of FIG. 1 or SCDE system 500 of FIG. 5. At the time that target entities are "running" or operating in the environment, the entities may have a stack relationship to each other. This stack 600 resides in the managed service layer 520 of the hosting environment tier 518 (or cell 560) in system 500 of FIG. 5. In this stack 600, each layer provides a hosting environment to components that operate in the layer above it. For example, the DEs 610 are hosted by servlet plug in 624 in the layer below which also includes a number of DEs 512, 514, 618, 620 in addition to DE 624 (which acts as a DE and an HE) that are hosted by the layer below and its HEs 630, 632, 634 shown as a J2EE application server, a Web server, and a C application for example. These in turn are DEs that are hosted by an operating system HE 640, which in turn is a DE hosted by hardware domain HE 650.

Generally, for example, a hardware domain 650 hosts an operating system 640 that in turn hosts an application server 630 that hosts applications 612, 614, 618. Each of these entities is an entity that is managed by the SCDE system (such as system 500 of FIG. 5) and resides in the managed software layer 520 of the hosting environment tier 518 (or cell 560). Thus, an entire runtime services operating stack 600 lies within cell 560.

The declarative parameters tier 512 may include one or more definitions of deployable entities and other managed entities via a set of parameters. For example, a person or entity interested in deploying a DE may supply these to the SCDE system 500 such as via an XML file in an "submit DE to SCDE" request or via SCDE console or by another input method. Some of the declarative parameters that may be provided in cell 540 may include a set of information useful for describing the control interfaces to the DE and concerning the code of the DE to allow the SCDE system 500 to locate and deploy it. The SCDE system 500 is configured to identify and manage dependencies during deployment or provisioning actions on a target system or hosting environment. To this end, a set of declarative parameters may be collected or generated that provides dependency maps in the following areas: code reference dependencies, resource requirements, and registrants (for example).

Generally, the SCDE systems of the invention, such as system 500 of FIG. 5, can be used by users or operator to perform a number of provisioning or deployment functions. These include creating a DE along with requirements, submitting a DE containing a service for deployment, adding a service instance to a hosting environment, modifying a deployed service instance, and removing a service from a hosting environment. FIG. 7 illustrates the use case 700 for adding a service to a target system with an SCDE system of the invention which is useful for allowing a system administrator or user 702 to deploy a service whose deployment package was previously submitted to the SCDE system. As shown the system administrator 702 submits an add service provisioning request 704 in the client tier 710 via the SCDE console or provisioning user interface 712 and request control interface 716. In the declarative parameters tier 720 service control objects 724 are provided, such as in a repository which may include the previously submitted service package.

In the SCDE coordination tier 730 the request control 732 receives the request 704 parsing the request while also working with security module 734 to login the user 702. The request is deployed to the request control 732 which obtains the declarative parameters including dependencies from the repository or objects 724 of declarative parameters tier 720. A read configuration function may be performed to read both the current HE configuration and the DE configuration, and validate that requirements can be met for deployment.

The request control 732 then calls operation control 736, operation choreographer 738, activity control 740, DPA proxy (DPAP) 742 and regulation and detection subsystems 744, 746 to process the request using the declarative parameters to call the appropriate provisioning procedures to add the service at the target system or in the appropriate hosting environment. The actual HE environment may be inspected for actual configuration data, such as by calling provisioning agents located in the boxes or associated with target system components (see, for example, the provisioning agents shown in FIG. 1 in target system), that can then be compared to or matched with stored configuration information to verify that stored data is current and/or accurate.

The target environment tier 750 is shown to include the DPA 752 which is called or invoked based on or by the DPAP 742 to run the appropriate procedures to add the service. The PAT 754 is utilized by the DPA 752 to properly communicate with or interface via provisioning adaptors (or deployment plug-ins) with one or more provisioning tools/applications 756. Hence, the provisioning system 756 is in effect virtualized by the PAT 754 allowing effective communication via input provisioning request 704 with system administrator 702. If monitoring or detection is desired, a detection subsystem 758 can be invoked to provide threshold or other event notifications to the SCDE coordination tier 730 (e.g., detection system 746) and its components or to a registrant in the hosting environment tier (not shown). Similar use cases will be readily understood for other uses such as modifying service or remove service.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A computer-based method for automating provisioning of services in a target single or multiple computer systems, network systems, or storage systems, comprising:

providing a set of provisioning adaptors each defining an interface configured to format communications to a provisioning application;

receiving a provisioning request from a user interface, a control device or a network-based policy management system;

identifying one of the provisioning applications for completing a provisioning operation based on the received provisioning request;

invoking the identified one of the provisioning applications using one of the interfaces defined by one of the provisioning adaptors;

determining a set of dependencies defining an order for performing substeps of the provisioning operation, wherein reoccurring instances of the pair of identifying and invoking steps are performed in the order defined by the determined set of dependencies;

providing provisioning agents on one or more components on the target single or multiple computer systems, network systems, or storage systems;

collecting configuration data from the provisioning agents; and using the collected configuration data during the determining of the set of dependencies.

2. The method of claim 1, further comprising providing a proxy for a plurality of deployment procedures for executing the provisioning request, using the proxies during the identifying of the one of the provisioning applications to select a particular one of the deployment procedures in an array of procedures organized based on the operation and one or more activity associated with the operation, and running the selected deployment procedure to delegate to the one of the provisioning applications to complete the provisioning operation.

3. The method of claim 1, wherein the provisioning operation comprises adding a service to a host entity in the target single or multiple computer systems, network systems, or storage systems, modifying a service in the target single or multiple computer systems, network systems, or storage systems, or removing a service from the target single or multiple computer systems, network systems, or storage systems.

4. A service provisioning method, comprising:

receiving a provisioning request defining a deployable service, a target hosting environment, and a provisioning operation;

retrieving declarative parameters corresponding to the deployable service and the target hosting environment;

determining a dependency for the provisioning operation based on the declarative parameters;

selecting a deployment procedure to perform the provisioning operation; and invoking the deployment procedure to run in compliance with the determined dependency so as to perform the provisioning operation for the deployable service on the target hosting environment, wherein the retrieving of the declarative parameters comprises collecting configuration information with a provisioning agent running in a target system comprising the target hosting environment and including the collected configuration information in the retrieved declarative parameters.

5. The method of claim 4, wherein the invoking of the deployment procedure comprises communicating with a provisioning application in a provisioning system with a provisioning adaptor providing an interface to the provisioning application, the provisioning application being delegated to by the selected deployment procedure to perform at least a portion of the provisioning operation.

6. The method of claim 5, wherein the method comprises selecting additional ones of the deployment procedures to perform activities associated with the provisioning operation and invoking each of the additional ones including utilizing additional provisioning adaptors to provide interfaces to additional provisioning applications.

7. The method of claim 4, wherein the provisioning request is received in a first format and the method further includes converting the provisioning request to a second format for use in the selecting of the deployment procedure.

8. The method of claim 7, further comprising exposing a user interface requesting input of the provisioning request in the first format.

9. The method of claim 8, wherein the first format is eXtensible Markup Language or Web Services format.

* * * * *

UNITED STATES PATENT AND TRADEMARK OFFICE
CERTIFICATE OF CORRECTION

PATENT NO. : 8,819,202 B1
APPLICATION NO. : 11/194220
DATED : August 26, 2014
INVENTOR(S) : Carolan et al.

It is certified that error appears in the above-identified patent and that said Letters Patent is hereby corrected as shown below:

In the Specification

In column 1-2, lines 64-67 (in column 1), lines 1-20 (in column 2), delete "Dependencies can become……number of end users." and insert the same on Col. 1 Line 65 as a new paragraph.

In column 5, line 20, delete "dependencies" and insert -- dependencies may include dependencies --, therefor.

In column 5, line 25, delete "including" and insert -- including a --, therefor.

In column 6, line 24, delete "NIPS," and insert -- N1PS, --, therefor.

In column 8, line 66, delete "U1." and insert -- UI. --, therefor.

In column 9, line 61, delete "handed" and insert -- handled --, therefor.

In column 10, line 7, delete "NIPS)," and insert -- N1PS), --, therefor.

In column 14, line 31, delete "NIPS," and insert -- N1PS, --, therefor.

Signed and Sealed this
Tenth Day of March, 2015

Michelle K. Lee
*Deputy Director of the United States Patent and Trademark Office*